(12) United States Patent
Metzger

(10) Patent No.: US 7,337,468 B2
(45) Date of Patent: Feb. 26, 2008

(54) METHODS, APPARATUSES AND SYSTEMS FACILITATING SEAMLESS, VIRTUAL INTEGRATION OF ONLINE MEMBERSHIP MODELS AND SERVICES

(75) Inventor: Scott Metzger, San Luis Obispo, CA (US)

(73) Assignee: Truelink, Inc., San Luis Obispo, CA (US)

( * ) Notice: Subject to any disclaimer, the term of this patent is extended or adjusted under 35 U.S.C. 154(b) by 813 days.

(21) Appl. No.: 10/778,532

(22) Filed: Feb. 13, 2004

(65) Prior Publication Data

US 2004/0162986 A1   Aug. 19, 2004

Related U.S. Application Data

(60) Provisional application No. 60/447,224, filed on Feb. 13, 2003.

(51) Int. Cl.
*H04L 9/32* (2006.01)
(52) U.S. Cl. .............................. 726/6; 726/5; 713/185
(58) Field of Classification Search ............... 726/5–6; 713/185
See application file for complete search history.

(56) References Cited

U.S. PATENT DOCUMENTS

| 6,336,135 | B1 | 1/2002 | Niblett et al. |
| 6,480,894 | B1 | 11/2002 | Courts et al. |
| 6,668,322 | B1 * | 12/2003 | Wood et al. ................. 713/182 |
| 6,675,153 | B1 * | 1/2004 | Cook et al. .................... 705/74 |
| 2005/0125238 | A1 * | 6/2005 | Jansen ........................... 705/1 |

* cited by examiner

*Primary Examiner*—Gilberto Barrón, Jr.
*Assistant Examiner*—Jung Kim
(74) *Attorney, Agent, or Firm*—Mark J. Spolyar

(57) ABSTRACT

Methods, apparatuses and systems facilitating integration of the functionality associated with a first on-line service entity with the functionality associated with a second on-line service entity. Embodiments of the present invention allow a first on-line service entity having its own membership model to efficiently collaborate with a second on-line service entity to offer its users the services of the second on-line service entity in a seamless and consistently branded manner. One implementation obviates the need for synchronization of the membership models between the first and second on-line service entities. One implementation allows the second on-line service entity to provide services to the users associated with the first on-line service entity in a seamless manner without the first on-line service entity having to proxy the session between the second on-line service entity and the users.

15 Claims, 3 Drawing Sheets

METHODS, APPARATUSES AND SYSTEMS FACILITATING SEAMLESS, VIRTUAL INTEGRATION OF ONLINE MEMBERSHIP MODELS AND SERVICES

CROSS-REFERENCE TO RELATED APPLICATION

The present application claims priority from U.S. provisional patent application Ser. No. 60/447,224 filed Feb. 13, 2003 and entitled "Methods, Apparatuses and Systems Facilitating Seamless, Virtual Integration of Online Membership Models and Services."

FIELD OF THE INVENTION

The present invention relates to computer networks and, more particularly, to methods, apparatuses and systems facilitating the integration of services offered by a first on-line service entity with the services offered by a second on-line service entity. In one embodiment, the present invention facilitates the integration of network-based credit data retrieval and reporting systems with third party web sites and other network-based functionality.

BACKGROUND OF THE INVENTION

Providers of on-line or network-based services typically support user accounts into which users log to persist user account data, such as user names, passwords, addresses, payment information, preferences, etc. Such providers typically maintain their own proprietary, unique membership model including what types of membership data is maintained. When two separate on-line service providers desire to collaborate to extend the services or other functionality offered by one service provider with the services or functionality offered by the second service provider, the prior art methodology typically requires the two organizations to either 1) expend a large effort to bi-directionally synchronize the information associated with each organization's membership model and user account data, and/or 2) have one service entity proxy the session between the second service entity and the user. For technical and sometimes other reasons, such exchanges of data are not desirable. Moreover, for legal or other reasons, it is desirable and/or mandated by law or otherwise, that the data exchanged between a user and a first on-line service provider not flow through a second on-line service provider acting essentially as a proxy. This requirement, however, presents certain technical challenges when collaborating on-line service providers desire that their respective users experience a consistently branded service.

In light of the foregoing, a need in the art exists for methods, apparatuses and systems that facilitate collaboration between on-line service entities. A need in the art further exists for methods, apparatuses and system facilitating the integration of services offered by a first on-line service entity into the services provided by a second on-line service entity. A need further exists for methods, apparatuses and systems that allow for seamless, virtual integration of on-line service functionality without having one on-line service entity acting as a proxy for a second on-line service entity. Embodiments of the present invention substantially fulfill these needs.

SUMMARY OF THE INVENTION

The present invention provides methods, apparatuses and systems facilitating integration of the functionality associated with a first on-line service entity with the functionality associated with a second on-line service entity. Embodiments of the present invention allow a first on-line service entity having its own membership model to efficiently collaborate with a second on-line service entity to offer its users the services of the second on-line service entity in a seamless and consistently branded manner. Moreover, embodiments of the present invention obviate the need for synchronization of the membership models between the first and second on-line service entities. In addition, embodiments of the present invention allow the second on-line service entity to provide services to the users associated with the first on-line service entity in a seamless manner without the first on-line service entity having to proxy the session between the second on-line service entity and the users. This approach, for example, allows one on-line service entity to leverage its existing membership model with the offerings of a second on-line service entity, such as an on-line credit report service, without having to transmit any sensitive credit or other user information between the entities.

DESCRIPTION OF PREFERRED EMBODIMENT(S)

I. Overview of Operating Environment

Figure 1:
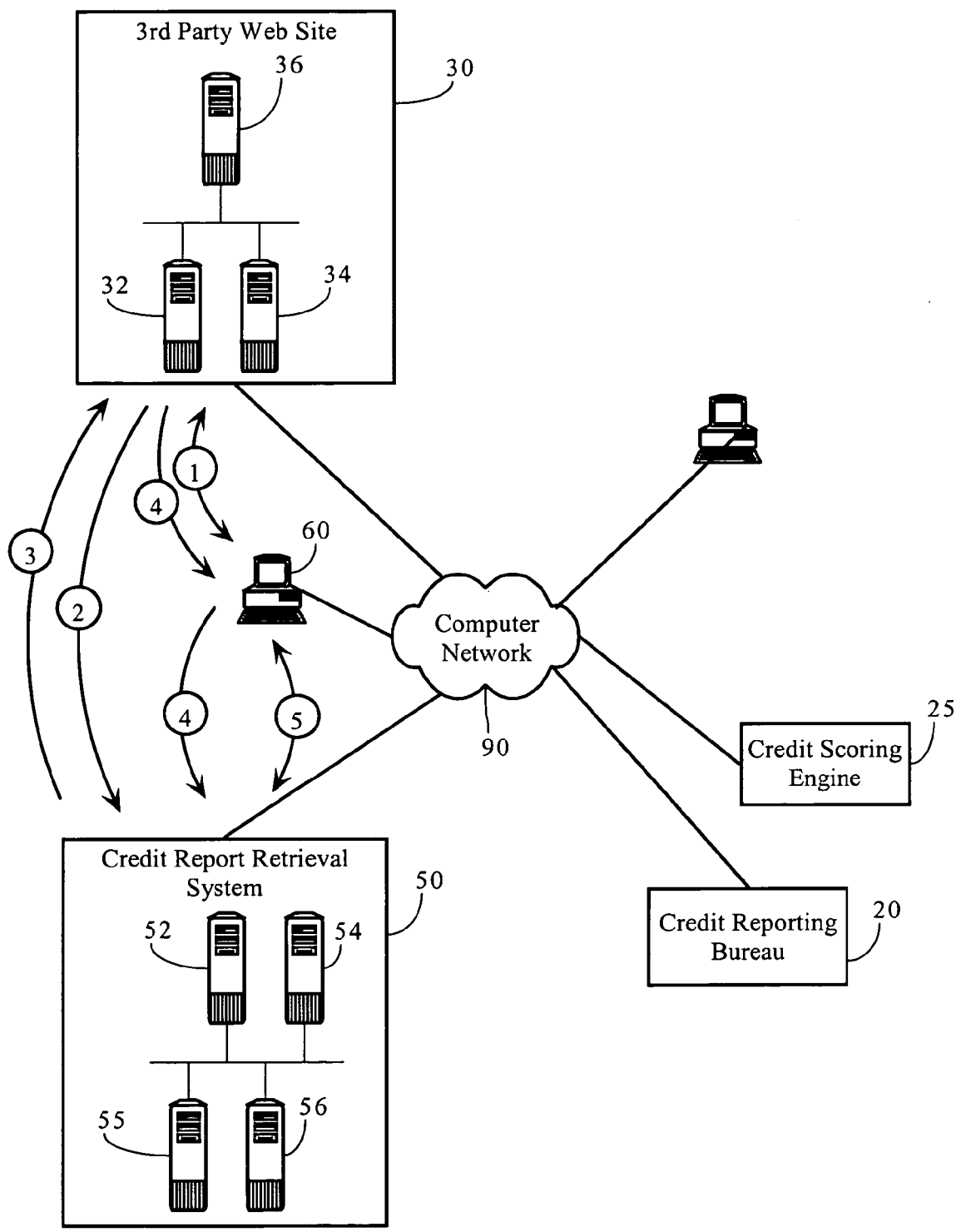
FIG. 1 is a functional block diagram illustrating a computer network environment including the functionality associated with a first embodiment of the present invention.

As FIG. 1 provides, an embodiment of the present invention operates in a computer network environment comprising at least one credit reporting bureau 20, credit scoring engine 25, third-party web site 30, credit data retrieval system 50, and at least one client computer 60 associated with one or more individual users. Computer network 90 can be any suitable computer network, including the Internet or any wide area network. In one embodiment, users access credit data retrieval system 50 over computer network 90 with a network access device, such as client computer 60 including suitable client software, such as a web browser, for transmitting requests and receiving responses over a computer network. However, suitable network access devices include desktop computers, laptop computers, Personal Digital Assistants (PDAs), and any other wireless or wireline device capable of exchanging data over computer network 90 and providing a user interface displaying data received over computer network 90. In one embodiment, the present invention operates in connection with an HTML compliant browser, such as the Microsoft Internet Explorer® or Netscape Navigator® browsers.

In one embodiment, credit data retrieval system 50 comprises Web/HTTP server 52, application server 54, database server 56 and web services network gateway 55. Web/HTTP server 52 is operative to establish HTTP or other connections with client computers 60 (or other network access devices) to receive requests for files or other data over computer network 90 and transmit responses in return, as discussed herein. In one embodiment, Web/HTTP server 52, or at least the HTTP server functionality that operates in connection with third-party web site 30, is operative to establish privileged sessions; that is, Web/HTTP server 52 only generates sessions and creates session IDs indirectly for users only in connection with partner third-party web sites 30 after authentication (such as verification or validation of a digital signature of third-party web site 30) (see below). Users, at client computers 60 require a valid session ID (obtained from or in connection with third-party web site 30, as discussed below) to access Web/HTTP server 52 and, therefore, the functionality of credit data retrieval system 50. Accordingly, this configuration allows users associated with third-party web site 30 to reinitiate a session only through third-party web site 30. In one embodiment, credit data retrieval system 50 further includes an additional Web/HTTP server (not shown), including an IP address different from Web/HTTP server 52, that operates in a conventional manner to process requests and responses for direct users (i.e., users not associated with third-party web site 30) of credit data retrieval system 50.

Otherwise, Web/HTTP server 52, in one embodiment, incorporates conventional HTTP server and connection state management functionality. In one embodiment, Web/HTTP server 52 passes user requests to application server 54 which composes a response and transmits it to the user via web server 52. In one embodiment, web server 52 establishes a secure connection to transmit data to users and other sites, using the SSL ("Secure Sockets Layer") encryption protocol part of the HTTP(S) ("Secure HTTP") protocol, or any other similar protocol for transmitting confidential or private information over an open computer network. Database server 56 stores the content and other data associated with operation of credit data retrieval system 50. Application server 54, in one embodiment, includes the functionality handling the overall process flows, described herein, associated with credit data retrieval system 50. Application server 54, in one embodiment, accesses database server 56 for data (e.g., HTML page content, etc.) to generate responses to user requests and transmit them to web server 52 for ultimate transmission to the requesting user. As one skilled in the art will recognize, the distribution of functionality set forth above among web server 52, database server 56 and application server 54 is not required by any constraint. The functionality described herein may be included in a single logical server or module or distributed in separate modules. In addition, the functionality described herein may reside on a single physical server or across multiple physical servers. In addition, although one web server 52 is depicted in FIG. 1, multiple web servers may be used in connection with session clustering to store session state information in a central database for use by the multiple web servers, and to provide for failover support.

In one embodiment, third-party web site 30 comprises web server 32, application server 34 and database server 36. Web server 32 receives requests for files or other data over computer network 40 and passes them to application server 34. In one embodiment, web server 32 transmits data to users and other sites using the HTTP and related protocols, or any other similar protocol for transmitting data over a computer network. In one embodiment, database server 36 stores content and other data relating to the operation of the third-party web site 30. Application server 34, according to one embodiment, accesses database server 36 and generates pages or other files that web server 32 transmits over computer network 90 to the intended recipient. As discussed more fully below, third-party web site 30 offers its users the ability to obtain credit report information by advertising these services on the web pages, such as its home page, it serves to users. Users who opt for such services click on links or otherwise communicate a request to order the services, thereby triggering the methodology and protocols discussed below.

Credit scoring engine 25, in one embodiment, is a web-based application service operative to compute a credit score given a set of credit data. Credit scoring engine 25 is operative to receive credit report data relating to an individual or other entity and process the data against a proprietary or other credit scoring model to yield a credit score. Suitable credit scoring models including a FICO® credit scoring model, CreditXpert®, TransRisk®, or any other suitable credit scoring model. In one embodiment, credit scoring engine 25 is a stand-alone web-based application remote from credit data retrieval system 50 and/or credit reporting bureau 20. In other embodiments, the functionality of credit scoring engine 25, however, is integrated into other components associated with computer network 90. For example, credit scoring engine 25 may be incorporated as an internally executed application (such as CreditXpert) within credit data retrieval system 50, or within credit reporting bureau 20.

Credit reporting bureau 20 maintains a database or other repository of credit history data for at least one individual or other entity, such as the credit reporting services offered by TransUnion®, Equifax®, and Experian®. Credit reporting bureau(s) 20 offer web-based credit reporting application services. In one embodiment, at least one credit reporting bureau 20 is operative to access credit scoring engine 25 in response to a request from credit data retrieval system 50; in such an embodiment, the credit reporting bureau 20 transmits the credit reporting data associated with the individual to credit scoring engine 25 and receives a credit score in return. The credit reporting bureau 20 then returns the credit score with the credit report data to credit data retrieval system 50. In one embodiment, credit data retrieval system 50 formulates an XML request and transmits it to credit reporting bureau 20 to retrieve credit report data. In one embodiment, the XML request format includes a flag or other indication of whether a credit score is also desired. Credit reporting bureau 20 responds to the asynchronous or synchronous request by transmitting an XML response including credit report data corresponding to the individual identified in the XML request. In one embodiment, credit data retrieval system 50 operates in connection with one credit reporting bureau, such as TransUnion, Equifax, or Experian; however, in other embodiments, credit data retrieval system 50 obtains credit report data for a particular individual from at least two credit reporting bureaus 20 and merges the data into a single report. Co-pending and commonly owned application Ser. No. 09/644,139 filed Aug. 22, 2000 in the name of Guy et al. and entitled "Credit and Financial Information and Management System" discloses methods and systems that obtain credit report data from multiple sources and merge such data into a single report (incorporated by reference herein).

As discussed above, credit data retrieval system 50 further includes network services gateway 55 which implements web services network functionality to process and route service requests and responses over a computer network. In one embodiment, network services gateway 55 implements a communications model based on requests and responses. Network services gateway 55 generates and transmits a service request to an external vendor, such as credit reporting bureau 20 and/or credit scoring engine 25, which receives the request, executes operations on data associated with the request, and returns a response. Network services gateway 55, in one embodiment, further includes other web services functionality such as logging of service requests and responses allowing for tracking of costs and usage of services. Network services gateway 55, in one embodiment, relies on secure HTTP communications and XML technologies for request and response formats. In one embodiment, network services gateway 55 maintains Document Type Definitions (DTDs) and/or XML Schema Definitions (XSDs) that define the format of the XML request and XML response. Request and response XSDs, in one form, include a message type, transaction identification, vendor/service identification, and an application identification.

As one skilled in the art will recognize various embodiments are possible. For example, the credit retrieval functionality of system 50 may be incorporated into the functionality of credit reporting bureau 20. In addition, the functionality of credit scoring engine 25 may be incorporated into credit reporting bureau 20.

II. Operation

A. New Orders for Credit Reports

Figure 2:
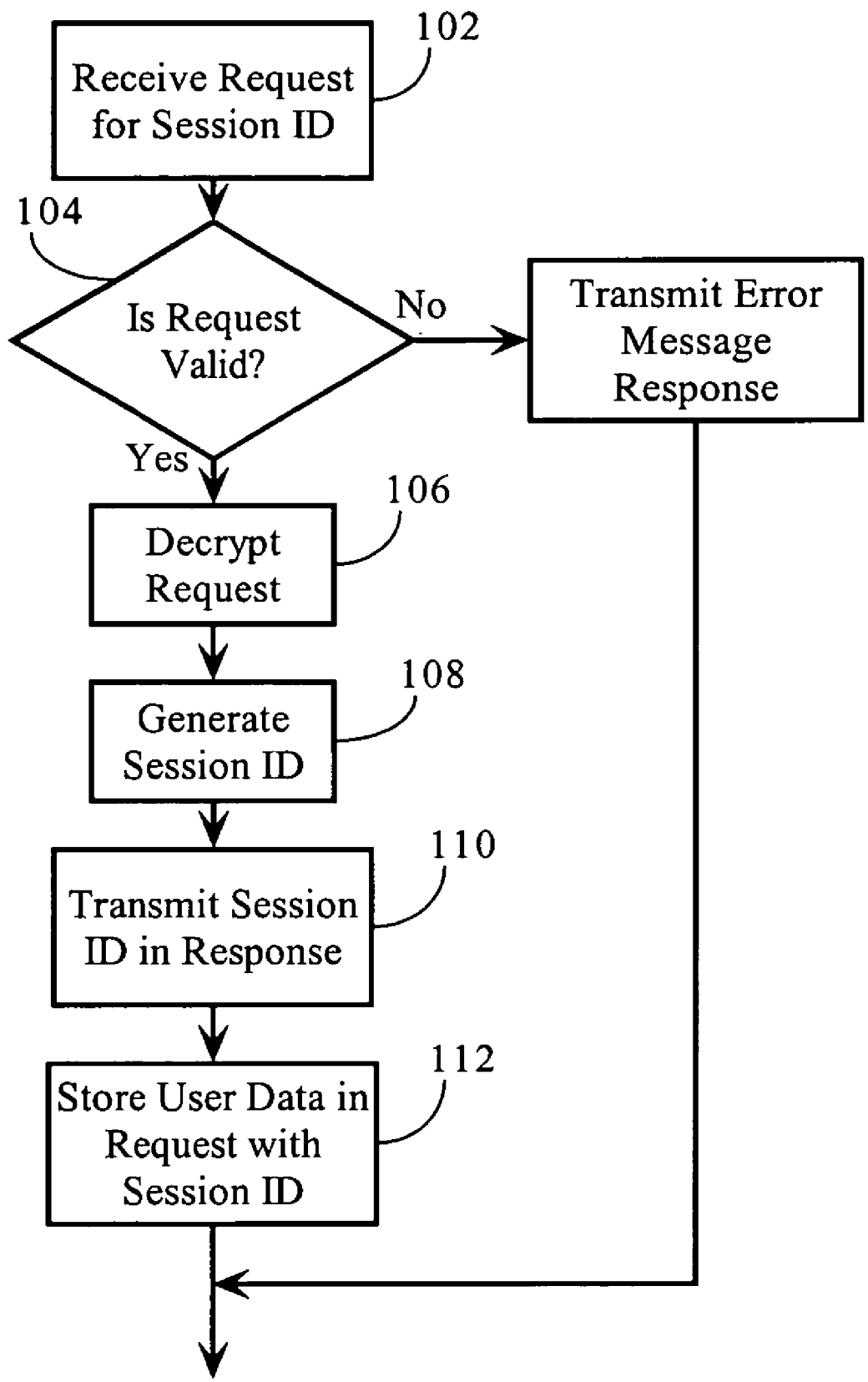
FIG. 2 is a flow chart diagram illustrating a method, according to an implementation of the present invention, directed to generating session identifiers in response to requests from third-party web sites.
Figure 3:
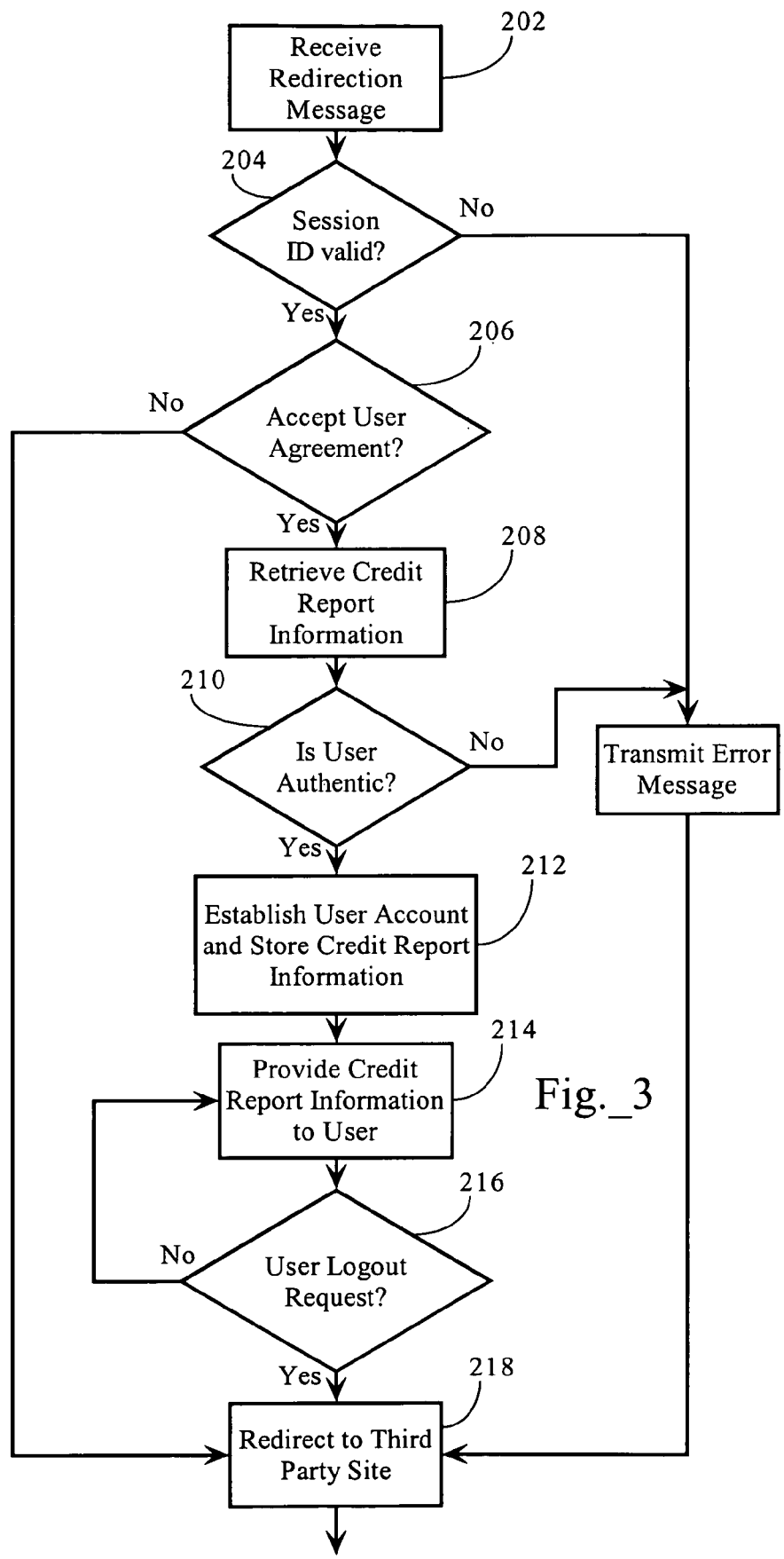
FIG. 3 is a flow chart diagram providing a method, according to one implementation of the present invention, directed to interacting with users who have been redirected to a server or cluster or servers that issued session identifiers.

FIG. 1 further illustrates the overall message and process flow associated with an embodiment of the present invention. In addition, FIGS. 2 and 3 illustrate methods performed, in one implementation, by credit report retrieval system 50. As FIG. 1 illustrates, a user at client computer 60 accesses third-party web site 30 by inputting the URL or IP address of web site 30 into the location bar of the browser or other client-side application resident on client computer 60 (Ref. No. 1). As discussed above, third-party web site 30 offers credit reporting services to the user by adding appropriate links and content to at least some of the web pages it serves. In one embodiment, third-party web site 30 presents an order page to the user requiring the user to enter personal information sufficient to identify the user for purposes of pulling a credit report and also requires the user to enter payment information, such as a credit card account number and expiration date. Third-party web site 30, in one embodiment, processes the payment transaction using the user-supplied information in a conventional or any suitable manner.

In one embodiment, if the payment transaction is authorized, third party web site 30 then transmits a receipt page to the user seeking confirmation of the order. When the user confirms the order by, for example, clicking on an "accept" button or other interface control, third-party web site 30 then composes and transmits a request for a session ID from credit data retrieval system 50 (Ref. No. 2). In one embodiment, the request includes a unique userid, co-brand id, transaction information, the user's social security number (SSN), first name, last name, address, and email. In one embodiment, the request is formatted as an XML request. In one embodiment, the request is digitally signed with the private key of the third-party web site 30 and encrypted with the public key corresponding to credit data retrieval system 50.

In one embodiment, third-party web site 30 then posts this request to credit data retrieval system 50, which receives the request (FIG. 1, 102) operates on the request to generate a session ID and return it in a response to third-party web site 30 (Ref No. 3). In one embodiment, the functionality associated with the credit data retrieval system 50 that generates session IDs is presented as a web-based application service accessible to third-party web site 30 via Simple Object Access Protocol (SOAP) based protocols and technologies. In one embodiment, credit data retrieval system 50 verifies the digital signature associated with the session ID request (104), decrypts the data using its private key (106), and initiates processing of the request. Credit data retrieval system 50, in one implementation, uses the state management functionality of web/HTTP server 52 to generate a session for the end user identified in the request (108) and returns a session ID to third-party web site 30 (Ref. No. 3) (110). Credit data retrieval system 50 also stores the user's personally identifying information in association with the session ID for later use (112).

After receipt of the session ID, third-party web site 30 sets the session ID on the browser executed on client computer 60 in the form of a cookie and redirects the end user's browser to the credit data retrieval system to begin the authentication/fulfillment process (Ref. No. 4). In one embodiment, third-party web site 30 uses HTML frames to allow the user's experience to be branded with the third-party web site identifiers. For example, third-party web site 30 may use a title (top) frame, a left (navigation) frame and a main/body frame including the majority of the content. According to this embodiment, the redirection message (e.g., an HTML page including a meta refresh tag pointing to the URL of credit data retrieval system 50) is transmitted to the browser within the context of a main/body frame. Other embodiments are possible. For example, the use of HTML frames is only one preferred embodiment. The redirection message can also be transmitted within the context of a new or pop-up browser window, or within the context of a new HTML page transmitted to the same browser window.

The redirection message and process flow can take a variety of forms. As discussed above, the redirection message may comprise an HTML page including a meta refresh tag and the URL or IP address associated with the credit data retrieval system 50. In another embodiment, the HTML page may include JavaScript in the HTML page that, when executed within the context of the user's browser, is operative to generate an HTTP GET request to credit data retrieval system 50. In another embodiment, third-party web site 30, rather than directly interacting with credit data retrieval system 50 to obtain a session ID, transmits an HTML page including an operative, such as Javascript code or a link embedded in the HTML page, to cause the browser on client computer 60 to generate an HTTP POST request to credit data retrieval system 50 including a request for a session identifier that, in one implementation, includes the user information discussed above, and is digitally signed by third-party web site 30, encrypted, and encoded in a hidden field. Credit data retrieval system 50, as discussed above, verifies the digital signature and decrypts the user information data and generates a session ID and returns it directly to the user's browser.

When the browser processes the redirection message and transmits the request to credit data retrieval system 50, web/HTTP server 52 receives the request (FIG. 3, 202) and looks up the session ID contained in the cookie included in the request header against a session state database as with other conventional HTTP requests (204). Assuming the session ID is valid, credit retrieval system 50 then initiates the authentication and reporting functionality and interacts directly with the user at client computer 60 (Ref. No. 5) for the remainder of the session. In one embodiment, credit retrieval system 50 first presents at least one agreement associated with a credit reporting bureau to the user and prompts the user for acceptance or rejection of the agreement (206). If the user accepts the agreement, credit data retrieval system 50 accesses credit reporting bureau 20 for a credit report corresponding to the user, using the personally identifying information originally obtained from third-party web site 30 (208). In one embodiment, credit data retrieval system 50 authenticates the user by prompting him/her for information contained in the credit report and matching the user's response against the credit report data (210). As one skilled in the art will recognize, any suitable authentication protocol can be used. For example, the authentication protocols disclosed in U.S. Pat. No. 6,263,447, incorporated by reference herein, can be incorporated into embodiments of the present invention.

Assuming the user is authenticated, credit data retrieval system 50 then transmits an HTML page including the credit report to the user (214). As discussed above, in one embodiment, credit data retrieval system 50 includes an order for a credit score and displays the results to the user, as well. As one skilled in the art will recognize, various process flows can be implemented for delivering credit report functionality to users. For example, the user may be provided a combined credit report as described in U.S. application Ser. No. 09/644,139, incorporated by reference herein. In one embodiment, after or before the user views the credit report, credit data retrieval system 50 establishes a user account and password (in one embodiment, provided by the user) and stores the retrieved credit report (for subsequent viewing) in association with the user account (212). In one embodiment, credit data retrieval system 50 uses the userid supplied by third-party web site 30 as the user account identifier. In one embodiment, the user account is also tagged with the co-brand id corresponding to third-party web site 30. After the session is terminated (216), credit data retrieval system 50 redirects the user's browser to third-party web site 30 (218). To gain subsequent access to credit reporting data, the user must access third-party web site 30 to initiate another session with credit data retrieval system 50, as described below.

B. Viewing an Existing Credit Report

The functionality described herein, in one embodiment, also allows the user to gain subsequent and continued access to his or her user account through the context of third-party web site 30. In one embodiment, the user logs into or otherwise accesses third party web site 30 and elects to view an existing credit report stored in a user account, as discussed above. Third party web site 30 formulates a request for a session ID, including a userid, transaction information (such as "view existing order") and co-brand id, as discussed above. Credit data retrieval system 50 verifies the digital signature, decrypts the request, and generates a session ID and transmits it to third party web site 30. Credit data retrieval system 50 also stores the userid and other transaction information in association with the session ID for later use. When the user is redirected to credit data retrieval system 50, it prompts the user for a user name and password. In one embodiment, credit data retrieval system 50 uses the userid supplied by third-party web site 30 to identify the user. If the user inputs a valid user name and password, credit data retrieval system 50 displays the credit report, if any, associated with the user account. Once logged in, the user has the option of ordering other services and/or ordering a new credit report.

Although the present invention has been described relative to specific embodiments, it is not so limited. For example, although the embodiments discussed above allow for the integration of a credit data retrieval system with a third-party web site, the present invention has application to a wide variety of on-line services. In addition, many modifications and variations of the embodiments described above will become apparent. For example, although the embodiments described above employed HTML, HTTP(S) and XML protocols and technologies, the present invention can use any suitable communications and data exchange technologies and protocols. Furthermore, other changes in the details, steps and arrangement of various elements may be made by those of ordinary skill in the art without departing from the scope of the present invention. Accordingly, the present invention has been described with reference to specific embodiments. Other embodiments of the present invention will be apparent to one of ordinary skill in the art. It is, therefore, intended that the claims set forth below not be limited to the embodiments described herein.

What is claimed is:

1. An apparatus facilitating integration of separate online services, comprising
    a session state module operative to
        generate session identifiers in response to requests for a session identifier;
        maintain session state information in association with the session identifiers, wherein the session state information comprises a user identifier;
    a server module operative to
        receive requests for session identifiers from a third-party site, wherein the third-party requests include user identifiers;
        authenticate the requests for session identifiers;
        access the session state module to obtain session identifiers for authenticated requests;
        transmit the session identifiers to the third-party site in response to the requests for session identifiers;
        receive requests from users, wherein the requests include session identifiers transmitted to the third-party sites;
        control access to resources available to the users by validating the session identifiers in the requests from users against the session state information maintained by the session state module;
    wherein the requests for a session identifier are transmitted indirectly via a host system corresponding to a user of the third-party site; and
    wherein the requests for session identifiers include a digital signatures created with an encryption key associated with the third-party site; and wherein the server module is operative to authenticate the requests for session identifiers by validating the digital signature.

2. The apparatus of claim 1 further comprising
    an application module operative to provide an application service to at least one user; and wherein the server module is operative to control access to the application module.

3. The apparatus of claim 1 wherein the requests for session identifiers include a digital signatures created with an encryption key associated with the third-party site; and wherein the server module is operative to authenticate the requests for session identifiers by validating the digital signature.

4. The apparatus of claim 1 wherein the requests for a session identifier are encrypted; and wherein the server module is further operative to decrypt the requests for a session identifier.

5. The apparatus of claim 4 wherein the requests for a session identifier are encrypted; and wherein the server module is further operative to decrypt the requests for a session identifier if the digital signature of the third-party web site is valid.

6. The apparatus of claim 1 wherein the requests for a session identifier further comprise a third-party site identifier, and wherein the state information maintained by state management module further comprises the third-party site identifier.

7. The apparatus of claim 1 wherein the requests for a session identifier are transmitted directly by the third-party site.

8. The apparatus of claim 1 wherein the requests for a session identifier are encrypted; and wherein the server module is further operative to decrypt the requests for a session identifier.

9. The apparatus of claim 1 wherein the requests for a session identifier are encrypted; and wherein the server module is further operative to decrypt the requests for a session identifier if the digital signature of the third-party web site is valid.

10. A method facilitating integration of separate online services, comprising
receiving, at a server, a request for a session identifier from a third-party site, wherein the request includes a user identifier and a third-party site identifier;
validating the request for a session identifier;
if the request for a session identifier is valid, creating a session and a session identifier in a session state database;
returning the session identifier to the third-party web sites;
receiving a request from a host system corresponding to a user, the request including the session identifier returned to the third-party web site;
verifying the session identifier against the session information maintained in the session state database; and
allowing the user access to functionality available through the server, if the session identifier is valid wherein allowing the user access comprises creating a user account corresponding to the user, wherein the user account is tagged with the third party site identifier.

11. The method of claim 10 wherein the session is represented in a data structure stored on a computer readable medium, and wherein the information associated with the session includes the user identifier and the session identifier.

12. The method of claim 10 wherein the request for a session identifier includes a digital signature created with an encryption key associated with the third-party web site; and wherein the validating step comprises validating the digital signature.

13. The method of claim 10 wherein the request for a session identifier is encrypted; and wherein the method further comprises decrypting the request for a session identifier.

14. The method of claim 12 wherein the request for a session identifier is encrypted; and wherein the method further comprises decrypting the request for a session identifier if the digital signature of the third-party web site is valid.

15. The method of claim 10 further comprising
receiving a request from a host system corresponding to a user, the request including the session identifier returned to the third-party web site;
verifying the session identifier against the session information maintained in the session state database;
allowing the user access to functionality available through the server, if the session identifier is valid.

* * * * *